United States Patent
Cordier et al.

(10) Patent No.: US 12,468,261 B2
(45) Date of Patent: Nov. 11, 2025

(54) MULTICOLOUR CERMET AND/OR CERAMIC ARTICLE AND MANUFACTURING METHOD THEREOF

(71) Applicant: Comadur SA, Le Locle (CH)

(72) Inventors: Thierry Cordier, Lugnorre (CH); Alexandre Le Colleter, Etray (FR); Julien Moreau, Morteau (FR); Pascal Chopard-Lallier, Montlebon (FR)

(73) Assignee: Comadur SA, Le Locle (CH)

( * ) Notice: Subject to any disclaimer, the term of this patent is extended or adjusted under 35 U.S.C. 154(b) by 563 days.

(21) Appl. No.: 17/727,947

(22) Filed: Apr. 25, 2022

(65) Prior Publication Data

US 2023/0018152 A1    Jan. 19, 2023

(30) Foreign Application Priority Data

Jul. 19, 2021 (EP) .................... 21186465

(51) Int. Cl.
| | |
|---|---|
| *B23K 26/364* | (2014.01) |
| *B28B 1/24* | (2006.01) |
| *G04B 19/28* | (2006.01) |
| *G04D 3/00* | (2006.01) |

(52) U.S. Cl.
CPC ......... *G04B 19/283* (2013.01); *G04D 3/0069* (2013.01); *B23K 26/364* (2015.10); *B28B 1/24* (2013.01)

(58) Field of Classification Search
CPC ...... G04B 19/283; G04B 3/04; G04B 19/042; G04B 19/12; G04B 19/28; G04B 37/225; G04D 3/0069; G04D 3/0043; B23K 26/364; B28B 1/24; B28B 1/008; B28B 11/0872; B28B 1/16; B28B 11/001; C04B 2235/6022; C04B 2235/9661; C04B 35/486; B22F 3/23; C22C 29/18
See application file for complete search history.

(56) References Cited

U.S. PATENT DOCUMENTS

| | | | |
|---|---|---|---|
| 5,008,060 A * | 4/1991 | Kanai | B29C 45/1675 264/296 |
| 10,585,399 B2 | 3/2020 | Issartel et al. | |
| 2016/0090326 A1* | 3/2016 | Matsuyuki | B32B 18/00 264/642 |
| 2022/0179365 A1* | 6/2022 | Chopard-Lallier | B22F 3/225 |

FOREIGN PATENT DOCUMENTS

| | | | |
|---|---|---|---|
| CH | 711378 A2 * | 1/2017 | |
| CH | 715336 A2 | 3/2020 | |
| CN | 108439997 A1 | 8/2018 | |

(Continued)

OTHER PUBLICATIONS

JP-5991050-B2, Nagayama, machine translation (Year: 2016).*

(Continued)

*Primary Examiner* — John A Hevey
(74) *Attorney, Agent, or Firm* — Sughrue Mion, PLLC

(57) ABSTRACT

Provided is a multicolour cermet and/or ceramic article, and in particular a bezel of a timepiece, made by a method for injecting at least two materials of distinct colours, said article comprising a relief decoration of a colour different from the rest of the article, said decoration being made by laser ablation after injection of the two materials.

10 Claims, 3 Drawing Sheets

(56) References Cited

FOREIGN PATENT DOCUMENTS

| | | | | |
|---|---|---|---|---|
| CN | 212811764 U | * | 3/2021 | |
| JP | 5991050 B2 | * | 9/2016 | |
| JP | 2017-517006 A | | 6/2017 | |
| WO | 2015/150552 A1 | | 10/2015 | |
| WO | WO-2016208668 A1 | * | 12/2016 | ............. C04B 37/00 |

OTHER PUBLICATIONS

CH-711378-A2, Taton, machine translation (Year: 2017).*
CN-212811764-U, machine translation. (Year: 2021).*
WO-2016208668-A1, machine translation. (Year: 2016).*
European Search Report of EP21186465.7 dated Dec. 15, 2021 [PCT/ISA/210].

* cited by examiner

MULTICOLOUR CERMET AND/OR CERAMIC ARTICLE AND MANUFACTURING METHOD THEREOF

CROSS REFERENCE TO RELATED APPLICATIONS

This application is claiming priority based on European Patent Application No. 21186465.7 filed on Jul. 19, 2021, the disclosure of which is incorporated herein in its entirely by reference.

TECHNICAL FIELD

The present invention relates to an article obtained by multi-injection of ceramics and/or cermets. It relates more particularly to a horological component such as a bezel, made by injection of ceramic and/or cermet materials of different colours with one colour forming a decoration of the horological component.

PRIOR ART

The ceramic or cermet horological components are generally obtained by a method for injecting a material followed by sintering. These components often have a decoration, such as indexes and numerals for a bezel, which is of a colour distinct from the rest of the component. The elements of the decoration are generally directly mounted by brazing or gluing on the movement-blank resulting from the sintering. This mechanical assembly between the movement-blank and the elements of the decoration can be expensive and complicated to implement.

An alternative to this mechanical assembly consists in making a movement-blank by injection of materials of different colours with a colour intended to form the decoration after machining. However, manufacturing ceramic or cermet components with different colours is complex. Indeed, a significant shrinkage, which can amount to 30%, is observed during sintering. The shrinkage rate will be dependent on several factors which are among others the choice of the material and the volume of injected material. This can result in the bi-injection or more generally multi-injection methods, differences in shrinkage during sintering which will lead to a disengagement at the junction between the different materials.

In order to overcome this drawback, it has been proposed in the document EP 2 746 243 to inject a single material and to impregnate a portion of the green body before sintering with a solution comprising a metal acting as a pigment. However, this method has the drawback that it is difficult to obtain a uniform colour in the mass of the coloured portion.

SUMMARY OF THE INVENTION

The object of the present invention is to overcome the aforementioned drawbacks by proposing a new multi-material injection method limiting the differences in shrinkage between the injected materials of distinct colours, with a subsequent step of machining the decoration in one of the colours.

To this end, the present invention relates to a manufacturing method using, during the injection step, an insert having a relief or hollow structure intended to imprint, on the first injected material, a hooking surface for the second injected material. This hooking surface allows holding the second injected material and thus reducing the shrinkage during the sintering step.

More specifically, the method of manufacturing the article according to the invention includes the following steps:
Providing at least one first material and one second material, said first material being distinguished from the second material by its chemical composition and more particularly by its colour, said first and second materials being either a ceramic or a cermet,
Providing a mould with a pattern cavity comprising a portion provided with a relief or hollow structure intended to form the hooking surface on the first material,
Injecting said first material into the pattern cavity provided with the portion so as to print the structure on a portion of the first material and thus form the hooking surface on said portion,
Injecting the second material onto the first material at least at the hooking surface to form a green body,
Sintering the green body to form a movement-blank,
Machining, by laser ablation, at least the second material to make the decoration in said second material on the bottom of said first material,
Finishing the movement-blank to obtain the article.

Advantageously, the method further comprises another machining step before and/or after the sintering step to size respectively the green body and/or the movement-blank.

The present invention also relates to the ceramic and/or cermet article resulting from the manufacturing method. The article according to the invention includes at least two distinct materials being differentiated by their colour, more generally by their aesthetic appearance. According to the invention, the decorated article is formed in one piece without discontinuity between the decoration and the rest of the article, unlike an article decorated by directly mounting, by brazing or gluing, the elements of the decoration on the article. According to the invention, the decoration as well as the rest of the article are tinted in the mass with a uniform colour for each colour.

Other features and advantages of the present invention will appear in the following description of a preferred embodiment, presented by way of non-limiting example with reference to the appended drawings.

DETAILED DESCRIPTION

The present invention relates to a manufacturing method by injection of an article made with at least two distinct materials which are either a cermet or a ceramic. The term "distinct materials" means materials being differentiated by their aesthetic appearance, and in particular their colour. This results in differences in chemical compositions. It can be the same base material with different pigments to change the colour or different base materials. By way of example, it may be the same zirconium oxide base material with, on the one hand, a black pigment to obtain a black material and, on the other hand, alumina to obtain the white colour. More generally, the ceramics can be nitrides, carbides and/or oxides. Similarly, cermets may include a ceramic phase including carbides, nitrides and/or oxides and a phase of a metal binder selected, for example, from precious elements such as ruthenium, rhodium, palladium, osmium, iridium, platinum, gold and silver.

Figure 6:
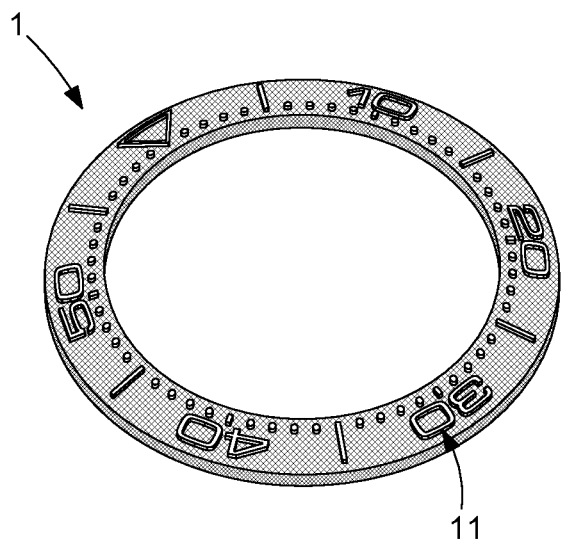
FIG. 6 represents a three-dimensional view of a decorated bezel resulting from the manufacturing method according to the invention.
Figure 7:
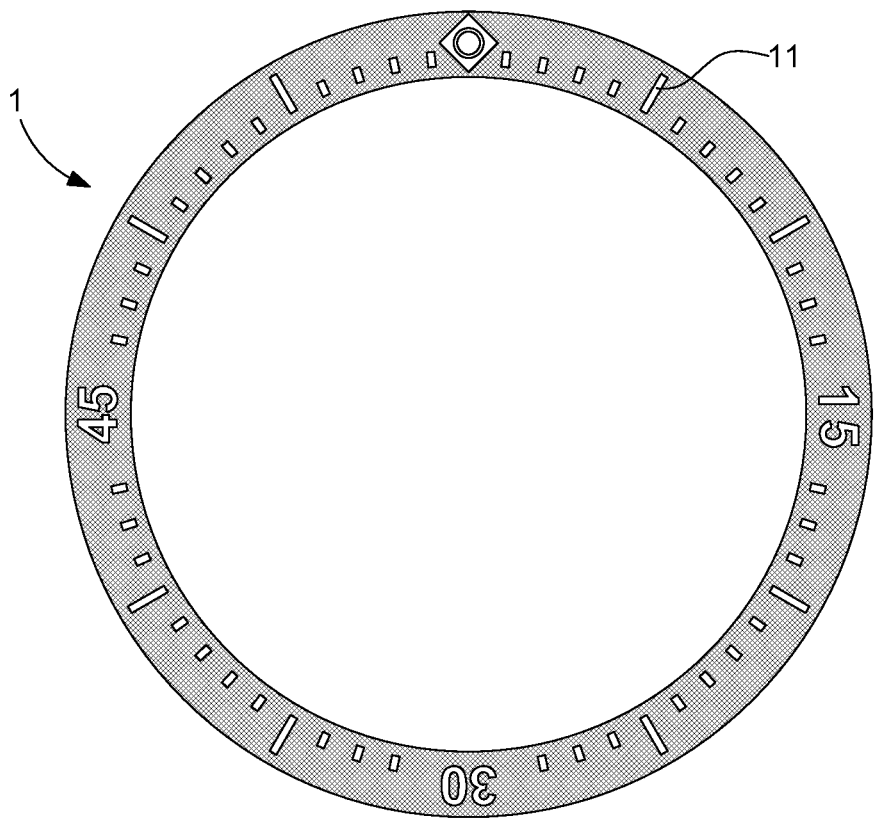
FIG. 7 represents a plan view of a decorated bezel resulting from the manufacturing method according to the invention.

The article according to the invention can be a decorative article such as a constituent element of watches, jewelry, bracelets, etc. In the watchmaking field, this article can be an external component such as a middle, a bottom, a bezel, a bezel insert, a push-piece, a crown, a bracelet link, a buckle, a dial, a hand, a dial index, etc. It can also be a movement component such as an oscillating weight, a plate, etc. By way of illustration, the article is a bezel 1 made with two ceramics of different colours, for example black and white, with one colour which forms the bottom and another colour which forms the decoration 11 as represented in FIGS. 6 and 7. Still by way of example, it could be an acronym on a watch crown.

The article is made by injecting different materials to form a green body and by sintering said green body. The manufacturing method is illustrated below for an article comprising two distinct materials, but it could be an article comprising 3, 4, etc. different materials with creation of a hooking surface for each of the successive injected materials. Similarly, it is illustrated for an article with a decoration of the same colour while there might be decorations of different colours.

Figure 1:
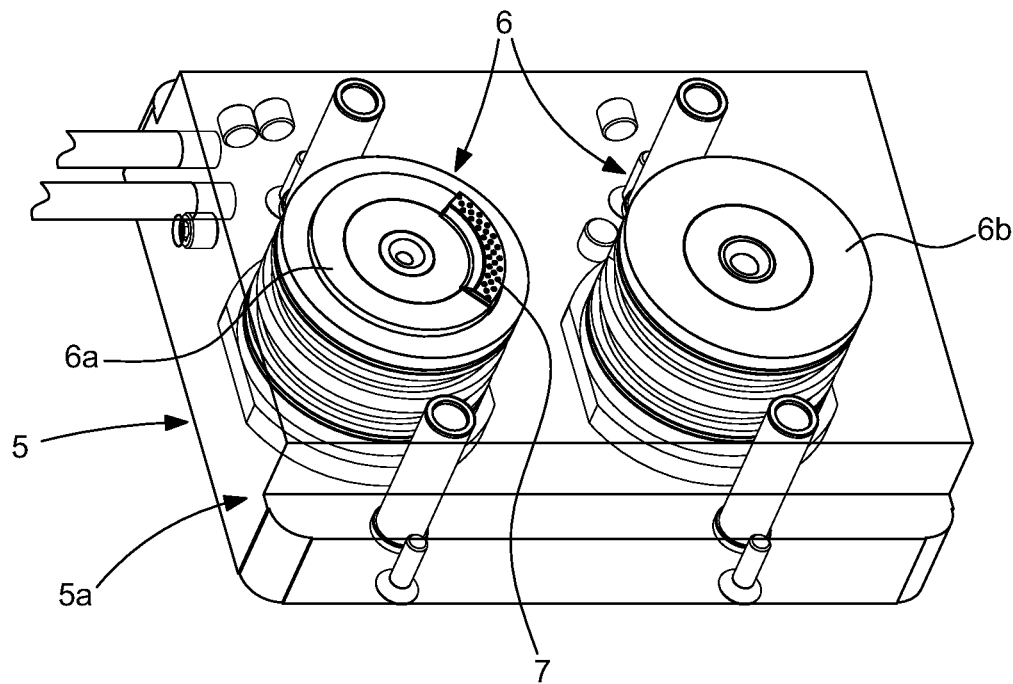
FIG. 1 represents a three-dimensional view of the double pattern cavity of the fixed portion of the mould with one of the two pattern cavities comprising an insert with a relief structure according to the invention.
Figure 2:
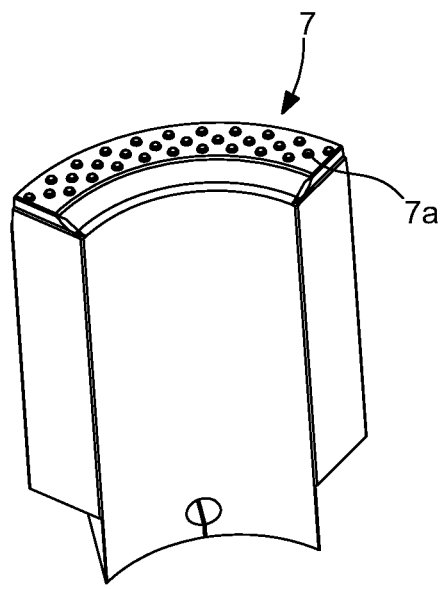
FIG. 2 represents a three-dimensional view of the insert with the relief structure.

The manufacturing method includes the following steps with reference to FIGS. 1 to 7:

Providing at least one first material 2 and one second material 3, said first material being distinguished from the second material by its colour and therefore by its chemical composition, said first and second materials being either a ceramic or a cermet. Thus, the first and second materials can both be a ceramic or both a cermet or else one material can be a ceramic and the other a cermet, Providing a mould 5 with a pattern cavity 6 comprising a portion 7, also called insert, including a relief or hollow structure intended to form a hooking surface on the first injected material (FIG. 1). Preferably, said structure is in relief. This structure is preferentially discontinuous. It can thus be formed of a multitude of studs 7a (FIG. 2) or recesses. This discontinuous structure is preferred relative to a continuous structure such as a groove or a tab for better material retention. Preferably, the recesses or studs respectively have a depth or a height of at least 0.2 mm. Preferably, the studs or recesses are 1 to 10 in number, more preferably 1 to 3 per 10 mm$^2$ of surface.

Injecting said first material 2 into the pattern cavity 6 provided with the insert 7 so as to print the structure on a portion of the first material 2 and thus form the hooking structure for the second material 3, Injecting the second material 3 onto the first material 2 at least at the hooking surface to form a green body 8 (FIG. 3 and FIG. 4), Sintering the green body 8 to form a movement-blank, Machining, by laser ablation, at least the second material 3 of the green body 8 or of the movement-blank to make a decoration 11 standing on the first material 2 of the movement-blank, the second material 3 being hollowed out to the first material 2 to reveal the latter and leaving only a decoration 11 in said second material 3, Finishing the movement-blank to obtain the article.

During the machining step, the first material can also be slightly hollowed out to remove the material at the hooking zone which would have remained visible next to the decoration. In other words, it concerns removing the structure printed on a portion of the first material which would be visible next to the decoration. In the presence of more than two materials of different colours, the different materials can be hollowed out to draw decorations of different colours. Thus, in the presence of a third material injected onto the second material, the third material can be hollowed out to the second material or even to the first material to form a decoration standing on the second material or on the first material or partially on the second material and on the first material.

The laser ablation machining step can be carried out before sintering, i.e. on the green body, or after sintering, i.e. on the movement-blank.

The laser ablation is preferably carried out with a pulsed laser such as a picosecond, nanosecond or femtosecond laser.

The method may further include another machining step, also called second machining step, intended to size the green body and/or the movement-blank. Preferably, it is operated on the green body before sintering so that the material is not too hard. The present invention does not exclude this machining step being carried out partly before sintering and partly after sintering.

The method can optionally include a debinding step before the sintering step if the materials have been injected with a system of organic binders (paraffin, polyethylene, etc.).

After machining by laser ablation, the manufacturing method includes a finishing step such as polishing, satin finishing, mattifying, etc.

Figure 3:
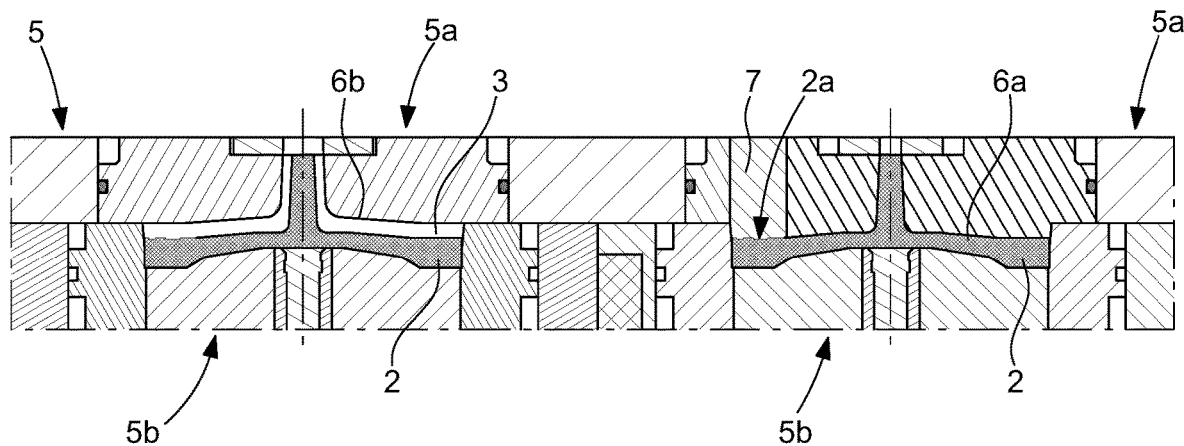
FIG. 3 represents a sectional view of the mould during respectively the injection of the first material on the right and the second material on the left.
Figure 4:
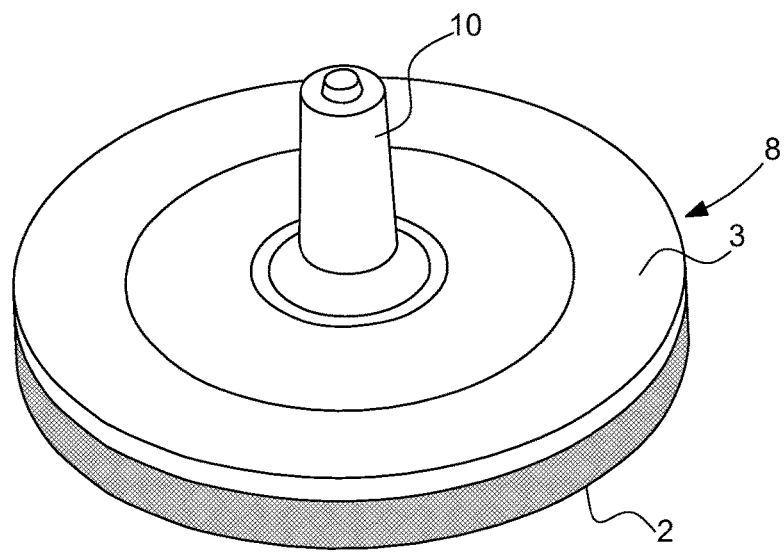
FIG. 4 represents a three-dimensional view of the green body resulting from the bi-injection of materials.
Figure 5:
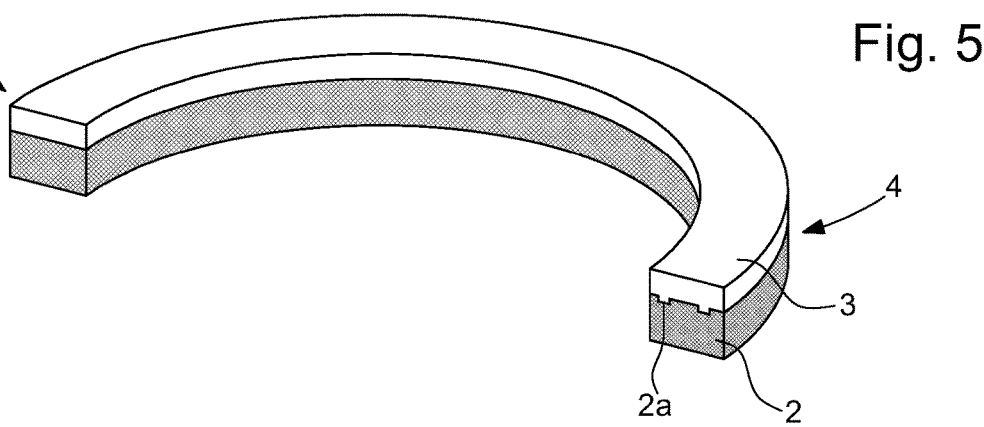
FIG. 5 represents a partial view of the green body of FIG. 4.

In the illustrated example, the injection device includes a mould 5 with a fixed portion 5a formed by two pattern cavities 6 with a first pattern cavity 6a intended for the injection of the first material 2 and a second pattern cavity 6b intended for the injection of the second material 3 (FIG. 1). The first pattern cavity 6a includes the insert 7 with the relief structure. In the example, the insert is directly mounted to the pattern cavity, but it could also be in one-piece with the rest of the pattern cavity. During injection, the first material 2 is injected into the mould 5 formed of the fixed portion 5a and the movable portion 5b as shown in FIG. 3 on the right. Then, the movable portion 5a with the first injected material 2 is displaced above the fixed portion 5b of the other pattern cavity 6b to carry out the injection of the second material 3 (FIG. 3 on the left). The insert 7 with a structure in relief is intended to print recesses 2a in the first material 2 which will be used as a hook during the injection of the second material 3. FIG. 4 represents the green body 8 resulting from the bi-injection with the second material 3 which is superimposed on the first material 2. The green body as well as the movement-blank at the end of the sintering includes a portion 4 where the two materials 2 and 3 are superimposed and more specifically interlocked (FIG. 5). The term "interlocking" means that one of the two materials has, on the surface thereof, a structure filled by the other material. In FIG. 5, there is shown the two materials 2 and 3 which are superimposed with the interlocking of one in the recesses 2a formed on the surface of the other.

In order to form a bezel, the sprue 10 is cut and the inner diameter of the bezel is hollowed out during the second machining step. Before or after, the second material is hollowed out by laser ablation to the at least the first material to form the decoration 11 in a colour distinct from the substrate formed by the bezel.

Typically, a bezel 1 according to FIGS. 6 and 7 is obtained by injection of a white zirconia and a black zirconia and by sintering at a temperature of 1400° C. for a time of 48 hours in an oxidizing atmosphere.

LEGEND (1) Article, horological component or bezel
(2) First material, also called ceramic
   a. Recess
(3) Second material, also called ceramic
(4) Portion of the article
(5) Mould
   a. Fixed portion
   b. Movable portion
(6) Pattern cavity
   a. First pattern cavity
   b. Second pattern cavity
(7) Insert, also called portion of the pattern cavity
   a. Stud
(8) Green body
(9) Sprue of the green Body
(10) Decoration

The invention claimed is:

1. A method for manufacturing by injection a multicolour cermet and/or ceramic article with a relief decoration, said method comprising the following steps:
   providing at least one first material and one second material, said first material being distinguished from the second material by its colour, said first and second materials being either a ceramic or a cermet,
   providing a mould with a first pattern cavity comprising a portion including a relief or hollow structure intended to form a hooking surface on the first material after injection,
   injecting said first material into the first pattern cavity provided with the portion so as to print the structure on a portion of the first material and thus form the hooking surface on said portion,
   injecting the second material into the same mould as the first material onto the first material at least at the hooking surface to form a green body,
   sintering the green body to form a movement-blank,
   machining, by laser ablation, the second material on the green body or on the movement-blank to make the relief decoration, said second material being hollowed out by laser ablation at least to the first material to reveal said first material and obtain the relief decoration in said second material standing on the first material,
   finishing the movement-blank to obtain the article,
   wherein the structure of the portion is discontinuous and the structure of the portion is formed of a multitude of structures provided in a quantity of 1 to 10 per 10 mm2 of surface.

2. The manufacturing method according to claim 1, characterised in that the structure of the portion is in relief.

3. The manufacturing method according to claim 2, characterised in that the structure of the portion is formed of a multitude of studs.

4. The manufacturing method according to claim 1, characterised in that the structure of the portion is hollow and formed of a multitude of recesses.

5. The manufacturing method according to claim 1, characterised in that the second material is injected onto the first material to form the green body comprising two superimposed layers with a layer of the first material and a layer of the second material, said layers being interlocked with each other at the hooking surface.

6. The manufacturing method according to claim 1, characterised in that, during the machining, the first material is partially hollowed out to remove visible portions of the hooking surface.

7. The manufacturing method according to claim 1, further comprising, before the sintering, machining the green body to size the multicolour cermet and/or ceramic article.

8. The manufacturing method according to claim 1,
   wherein the mould has a second pattern cavity for the injection of the second material,
   wherein the injecting said first material comprises injecting the first material into the first pattern cavity so as to print the structure on the portion of the first material and thus form the hooking surface on said portion, and
   wherein the injecting the second material comprises injecting the second material into the second pattern cavity onto the first material at least at the hooking surface to form the green body.

9. A method for manufacturing by injection a multicolour cermet and/or ceramic article with a relief decoration, said method comprising the following steps:
   providing at least one first material and one second material, said first material being distinguished from the second material by its colour, said first and second materials being either a ceramic or a cermet,
   providing a mould with a pattern cavity comprising a portion including a relief or hollow structure intended to form a hooking surface on the first material after injection,
   injecting said first material into the pattern cavity provided with the portion so as to print the structure on a portion of the first material and thus form the hooking surface on said portion,
   injecting the second material onto the first material at least at the hooking surface to form a green body,
   machining the green body to size the multicolour cermet and/or ceramic article,
   sintering the green body to form a movement-blank,
   machining, by laser ablation, the second material on the green body or on the movement-blank to make the relief decoration, said second material being hollowed out by laser ablation at least to the first material to reveal said first material and obtain the relief decoration in said second material standing on the first material,
   finishing the movement-blank to obtain the article,
   wherein the structure of the portion is discontinuous and the structure of the portion is formed of a multitude of structures provided in a quantity of 1 to 10 per 10 mm2 of surface.

10. The manufacturing method according to claim 1, wherein the structure of the portion is formed of a multitude of structures having a depth or a height of 0.2 mm.

* * * * *